United States Patent
Odani et al.

(10) Patent No.: US 10,527,755 B2
(45) Date of Patent: Jan. 7, 2020

(54) ACTIVE ENERGY RAY-CURABLE COMPOSITION AND PLASTIC LENS

(71) Applicant: DIC Corporation, Tokyo (JP)

(72) Inventors: Yasuko Odani, Ichihara (JP); Masanori Miyamoto, Ichihara (JP); Nobuo Kobayashi, Ichihara (JP); Naohiro Takeshita, Ichihara (JP); Ena Takeshita, Ichihara (JP); Changjun Deng, Shandong (CN); Xia Yang, Shandong (CN)

(73) Assignee: DIC Corporation, Tokyo (JP)

( * ) Notice: Subject to any disclaimer, the term of this patent is extended or adjusted under 35 U.S.C. 154(b) by 80 days.

(21) Appl. No.: 15/769,178

(22) PCT Filed: Oct. 6, 2016

(86) PCT No.: PCT/JP2016/079763
§ 371 (c)(1),
(2) Date: Apr. 18, 2018

(87) PCT Pub. No.: WO2017/068989
PCT Pub. Date: Apr. 27, 2017

(65) Prior Publication Data
US 2018/0299583 A1   Oct. 18, 2018

(30) Foreign Application Priority Data
Oct. 21, 2015  (JP) ................. 2015-207209

(51) Int. Cl.
*G02B 1/04* (2006.01)
*C08F 2/44* (2006.01)
*C08F 2/48* (2006.01)
*C08G 61/12* (2006.01)
*C08K 3/22* (2006.01)
*C08L 33/10* (2006.01)

(52) U.S. Cl.
CPC ............... *G02B 1/041* (2013.01); *C08F 2/44* (2013.01); *C08F 2/48* (2013.01); *C08G 61/124* (2013.01); *C08K 3/22* (2013.01); *C08K 2003/2244* (2013.01); *C08L 33/10* (2013.01)

(58) Field of Classification Search
CPC ........ C08K 5/3417; G02B 1/04; G02B 1/045; G02C 7/02; C08G 2261/76; C08G 2003/2244; C08G 2261/3241; C08G 2261/135
See application file for complete search history.

(56) References Cited

U.S. PATENT DOCUMENTS 10,336,696 B2 * 7/2019 Deng

FOREIGN PATENT DOCUMENTS

| JP | 04-325508 A | 11/1992 |
| JP | 05-341105 A | 12/1993 |
| JP | 2007-084815 A | 4/2007 |

OTHER PUBLICATIONS

International Search Report dated Dec. 20, 2016, issued for PCT/JP2016/079763.

* cited by examiner

*Primary Examiner* — Sanza L. McClendon
(74) *Attorney, Agent, or Firm* — Locke Lord LLP

(57) ABSTRACT

Provided are an active energy ray-curable composition which has a viscosity suitable for coating and also has a super high refractive index at a level higher than ever, a cured product thereof, and a plastic lens. The active energy ray-curable composition contains zirconium oxide nanoparticles (A) and a bicarbazole compound (B) represented by the following structural formula (1) (in the formula, $X^1$ and $X^2$ each independently represent a photopolymerizable functional group, a structural moiety having a photopolymerizable functional group, or a hydrogen atom, provided that at least one of $X^1$ and $X^2$ represents a photopolymerizable functional group or a structural moiety having a photopolymerizable functional group; and $R^1$ and $R^2$ each independently represent a hydrogen atom, an alkyl group having 1 to 4 carbon atoms, an alkoxy group having 1 to 4 carbon atoms, a bromine atom, or a chlorine atom).

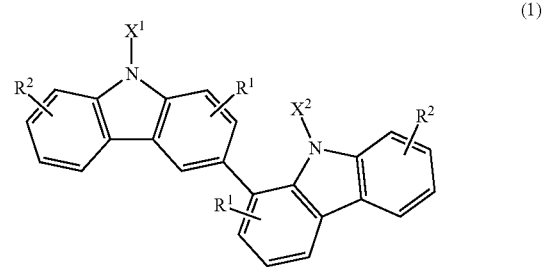

(1)

6 Claims, 1 Drawing Sheet

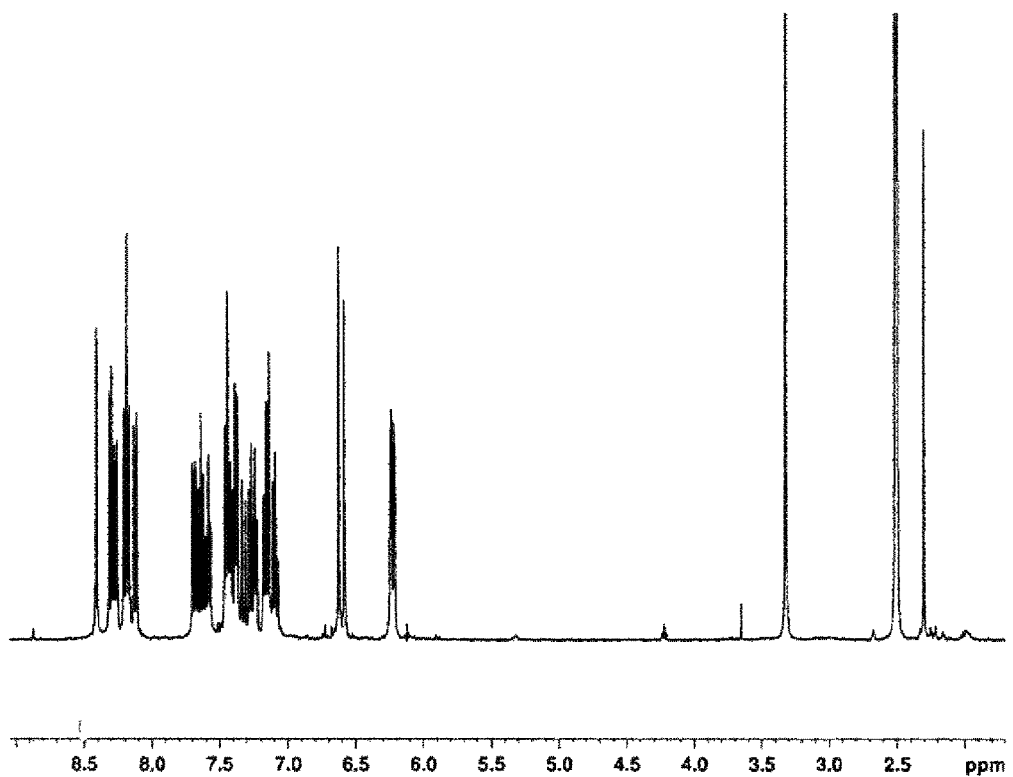

ACTIVE ENERGY RAY-CURABLE COMPOSITION AND PLASTIC LENS

TECHNICAL FIELD

The present invention relates to an active energy ray-curable composition which has a viscosity suitable for coating and also has a super high refractive index at a level higher than ever, a cured product thereof, and a plastic lens.

Resin materials have recently been widely used for optical components, such as optical over-coating agents, hard coating agents, antireflection films, spectacle lenses, optical fibers, optical waveguides, and holograms, in terms of excellent processability and productivity, and resin materials having high refractive indices have been demanded due to the tendency of reduction in size and thickness of such optical components or from the viewpoint of adjustment of antireflection. Particularly in recent years, there has been an increasing need for reduced size, increased resistance, and increased luminance in liquid crystal display elements used in displays on liquid crystal televisions, notebook personal computers, portable game machines, cell phones, and the like. Increase in refractive index of prism sheet materials is essential for realizing the above tasks.

From the viewpoint of increase in refractive index of prism sheet materials, for example, a technique using a bifunctional acrylate compound having a 9,9-bisphenoxyfluorene backbone as a photopolymerizable monomer has been heretofore known (see PTL 1 and PTL 2 shown below). However, such an acrylate monomer having a 9,9-bisphenoxyfluorene backbone itself is liquid with a high viscosity of several tens Pa·s or higher at normal temperature, and therefore, when used for an excipient material such as a prism sheet, the monomer has to be diluted with a large amount of a reactive diluent or the like so as to have an appropriate viscosity, which results in low refractive indices in cured products thereof.

In addition, a known composition as a prism sheet material having a high refractive index contains N-vinylcarbazole or a derivative thereof (PTL 3 shown below). However, N-vinylcarbazole itself is highly crystallized and therefore difficult to handle, and in addition, cured products obtained by curing the composition have insufficient refractive indices in the current situation.

As described above, known high refractive index-type polymerizable compounds are themselves liable to increase in viscosity or liable to be crystallized. Consequently, when the compounds are used in practical formulations, the refractive indices of cured products can not be sufficiently increased.

CITATION LIST

Patent Literature

[PTL 1] JP-A-04-325508
[PTL 2] JP-A-2007-84815
[PTL 3] JP-A-05-341105

SUMMARY OF INVENTION

Technical Problem

Accordingly, a problem to be solved by the present invention is to provide an active energy ray-curable composition which has a viscosity suitable for coating and also has a super high refractive index at a level higher than ever; a cured product thereof; and a plastic lens.

Solution to Problem

As a result of intensive studies for solving the above problem, the present inventors have found that combination use of an inorganic fine particle and a bicarbazole compound provides an active energy ray-curable composition having a significantly higher refractive index than ever, thereby completing the present invention.

Specifically, the present invention relates to an active energy ray-curable composition containing zirconium oxide nanoparticles (A) and a bicarbazole compound (B) represented by the following structural formula (1):

[Chem. 1]

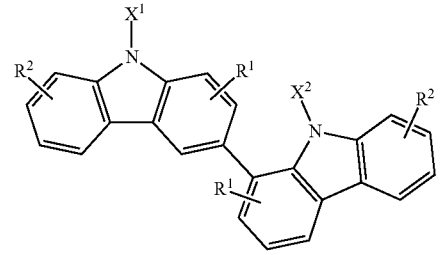

(1)

(in the formula, $X^1$ and $X^2$ each independently represent a photopolymerizable functional group, a structural moiety having a photopolymerizable functional group, or a hydrogen atom, provided that at least one of $X^1$ and $X^2$ represents a photopolymerizable functional group or a structural moiety having a photopolymerizable functional group; and $R^1$ and $R^2$ each independently represent a hydrogen atom, an alkyl group having 1 to 4 carbon atoms, an alkoxy group having 1 to 4 carbon atoms, a bromine atom, or a chlorine atom).

The present invention further relates to a cured product of the active energy ray-curable composition.

The present invention further relates to a plastic lens including a cured product of the active energy ray-curable composition.

Advantageous Effect of Invention

The present invention can provide an active energy ray-curable composition which has a viscosity suitable for coating and also has a super high refractive index at a level higher than ever; a cured product thereof; and a plastic lens.

BRIEF DESCRIPTION OF DRAWING

FIG. 1 is a 1H-NMR chart of a bicarbazole compound (B1) obtained in Production Example 2.

DESCRIPTION OF EMBODIMENTS

The active energy ray-curable composition of the present invention contains zirconium oxide nanoparticles (A) and a bicarbazole compound (B) represented by the following structural formula (1):

[Chem. 2]

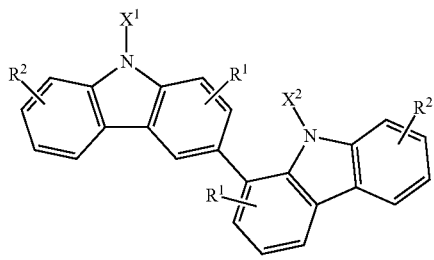

(1)

(in the formula, $X^1$ and $X^2$ each independently represent a photopolymerizable functional group, a structural moiety having a photopolymerizable functional group, or a hydrogen atom, provided that at least one of $X^1$ and $X^2$ represents a photopolymerizable functional group or a structural moiety having a photopolymerizable functional group; and $R^1$ and $R^2$ each independently represent a hydrogen atom, an alkyl group having 1 to 4 carbon atoms, an alkoxy group having 1 to 4 carbon atoms, a bromine atom, or a chlorine atom).

Combination use thereof provides an active energy ray-curable composition which has a viscosity suitable for coating and also has a super high refractive index at a level higher than ever.

The zirconium oxide nanoparticles (A) contained in the active energy ray-curable composition of the present invention is obtained by dispersing zirconium oxide particles (a) as a raw material into an organic component essentially containing a bicarbazole compound (B). The zirconium oxide nanoparticles (A) in the active energy ray-curable composition preferably has a mean particle size in the range of 20 to 100 nm because of providing a cured product having a high refractive index and also having excellent optical transparency.

Incidentally, in the present invention, the mean particle size of the zirconium oxide nanoparticles (A) is a value obtained by measuring particle sizes in an active energy ray-curable composition under the following conditions. Particle size measuring instrument: "ELSZ-2" manufactured by Otsuka Electronics Co., Ltd.
Sample for particle size measurement: a methyl isobutyl ketone solution of an active energy ray-curable composition with a nonvolatile content of 0.6% by mass.

As the zirconium oxide particles (a) used as a raw material, known zirconium oxide particles, such as a commercial product, may be used. The shape of the particles is not particularly limited, and may be any shape, such as, for example, a spherical, a hollow, a porous, a rod, a tabular, a fibrous, or an amorphous shape. Among them, a spherical shape is preferred because of having excellent dispersion stability and providing a cured product with a high refractive index. The zirconium oxide particles (a) preferably have a mean primary particle size of 1 to 50 nm, particularly preferably 1 to 30 nm because of having excellent dispersion stability and providing a cured product with a high light transmittance and a high refractive index. The crystal structure of the zirconium oxide particles (a) is also not particularly limited, but a monoclinic system is preferred because of having excellent dispersion stability and providing a cured product with a high refractive index. In the present invention, a functional group may be introduced onto the fine particle surface of the zirconium oxide particles (a) by using various silane coupling agents (C) or the like.

Examples of the silane coupling agents (C) include the following compounds.

As (meth)acryloyloxy-type silane coupling agents, 3-(meth)acryloyloxypropyltrimethylsilane, 3-(meth)acryloyloxypropylmethyldimethoxysilane, 3-(meth)acryloyloxypropyltrimethoxysilane, 3-(meth)acryloyloxypropylmethyldiethoxysilane, and 3-(meth)acryloyloxypropyltriethoxysilane are listed. As an acryloxy-type silane coupling agent, 3-acryloxypropyltrimethoxysilane is mentioned.

As vinyl-type silane coupling agents, allyltrichlorosilane, allyltriethoxysilane, allyltrimethoxysilane, diethoxymethylvinylsilane, trichlorovinylsilane, vinyltrichlorosilane, vinyltrimethoxysilane, vinyltriethoxysilane, and vinyltris(2-methoxyethoxy)silane are listed.

As epoxy-type silane coupling agents, diethoxy(glycidyloxypropyl)methylsilane, 2-(3, 4-epoxycyclohexyl)ethyltrimethoxysilane, 3-glycidoxypropyltrimethoxysilane, 3-glycidoxypropylmethyldiethoxysilane, and 3-blycidoxypropyltriethoxysilane are listed. As a styrene-type silane coupling agent, p-styryltrimethoxysilane is mentioned.

As amino-type silane coupling agents, N-2(aminoethyl)3-aminopropylmethyldimethoxysilane, N-2(aminoethyl)3-aminopropyltrimethoxysilane, N-2(aminoethyl)3-aminopropyltriethoxysilane, 3-aminopropyltrimethoxysilane, 3-aminopropyltriethoxysilane, 3-triethoxysilyl-N-(1,3-dimethyl-butylidene)propylamine, and N-phenyl-3-aminopropyltrimethoxysilane are listed.

As an ureido-type silane coupling agent, 3-ureidopropyltriethoxysilane is mentioned. As a chloropropyl-type silane coupling agent, 3-chloropropyltrimethoxysilane is mentioned. As mercapto-type silane coupling agents, 3-mercaptopropylmethyldimethoxysilane and 3-mercaptopropyltrimethoxysilane are listed. As a sulfide-type silane coupling agent, bis(triethoxysilylpropyl)tetrasulfide is mentioned. As an isocyanate-type silane coupling agent, 3-isocyanatopropyltriethoxysilane is mentioned. As an aluminum-type coupling agent, acetoalkoxyaluminum diisopropylate is mentioned.

The silane coupling agents (C) may be used alone or in combination of two or more thereof. Among them, those having a (meth)acryloyloxy group, a glycidyl group, or an epoxycyclohexyl group are preferred, and 3-(meth)acryloyloxypropyltrimethoxysilane is particularly preferred.

The content of the zirconium oxide nanoparticles (A) in the active energy ray-curable composition may be appropriately adjusted according to the desired viscosity and refractive index, but is preferably in the range of 5 to 80% by mass, and more preferably in the range of 10 to 60% by mass because of having excellent dispersion stability and providing an active energy ray-curable composition having a sufficiently high refractive index.

The bicarbazole compound (B) has a structure in which the position-1 carbon atom of a carbazole structure binds to the position-3 carbon atom of another carbazole structure, as represented by the following structural formula (1):

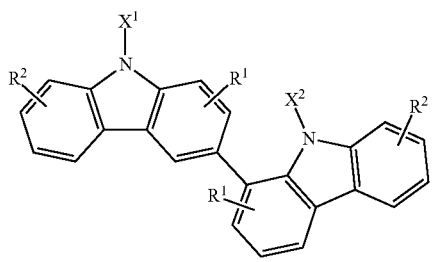

(1)

(in the formula, $X^1$ and $X^2$ each independently represent a photopolymerizable functional group, a structural moiety having a photopolymerizable functional group, or a hydrogen atom, provided that at least one of $X^1$ and $X^2$ represents a photopolymerizable functional group or a structural moiety having a photopolymerizable functional group; and $R^1$ and $R^2$ each independently represent a hydrogen atom, an alkyl group having 1 to 4 carbon atoms, an alkoxy group having 1 to 4 carbon atoms, a bromine atom, or a chlorine atom).

Such a compound is characterized by little tendency to crystallize, high compatibility with other active energy ray-curable compounds, and a dramatically high refractive index in terms of a cured product thereof.

In the structural formula (1), $R^1$ and $R^2$ each independently represent a hydrogen atom, an alkyl group having 1 to 4 carbon atoms, an alkoxy group having 1 to 4 carbon atoms, a bromine atom, or a chlorine atom. Among them, either one of $R^1$ and $R^2$ is preferably a hydrogen atom because such a compound has excellent compatibility with other compounds and exhibits a high refractive index in terms of a cured product thereof. In addition, another one of $R^1$ and $R^2$ is preferably any one of a methyl group, an ethyl group, a propyl group, a t-butyl group, a methoxy group, a chlorine atom, and a bromine atom.

In the structural formula (1), $X^1$ and $X^2$ each independently represent a photopolymerizable functional group, a structural moiety having a photopolymerizable functional group, or a hydrogen atom. Examples of the photopolymerizable functional groups include radically polymerizable functional groups, such as a vinyl group and an acryloyl group; and photocationically polymerizable functional groups, such as a glycidyl group and a 2-methylglycidyl group.

On the other hand, examples of the structural moieties having a photopolymerizable functional group include structural moieties having a photocationically polymerizable group, such as a 3-methyloxetanyl-methyl group and a 3-ethyloxetanyl-methyl group, and structural moieties having a radically polymerizable functional group, such as a (meth)acryloyl group-containing structural moiety represented by the following structural formula (2):

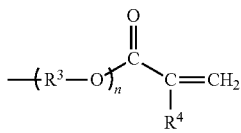

(2)

(in the formula, $R^3$ represents an alkylene group having 2 to 6 carbon atoms, $R^4$ represents a hydrogen atom or a methyl group, and n is an integer of 0 to 10).

Specific examples of the (meth)acryloyl group-containing structural moieties include a (meth)acryloyloxyethyl group, a (meth)acryloylpolyoxyethylene group, a (meth)acryloyloxypropylene group, and a (meth)acryloylpolyoxypropylene group. Among them, a (meth)acryloyloxyethyl group is preferred in terms of excellent reactivity, and increased refractive index in terms of a cured product.

In addition, in comparison between radically polymerizable functional groups and photocationically polymerizable functional groups mentioned above, radically polymerizable functional groups are preferred in terms of excellent curability. Furthermore, in the structural formula (1), one of $X^1$ and $X^2$ may be a hydrogen atom as mentioned above. However, in the present invention, both of $X^1$ and $X^2$ are each preferably a photopolymerizable functional group or a structural moiety having a photopolymerizable functional group in terms of excellent curability.

Specific examples of the bicarbazole compounds, when $X^1$ and $X^2$ in the structural formula (1) are vinyl groups, include those represented by the following structural formulae (I-1) to (I-5):

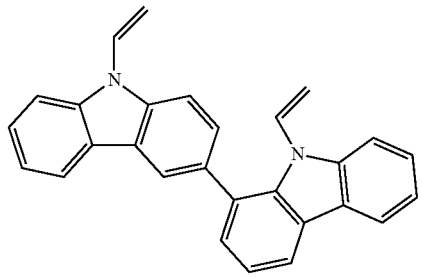

I-1

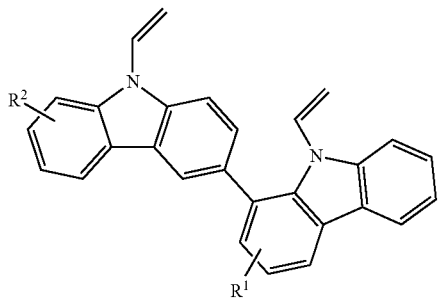

I-2

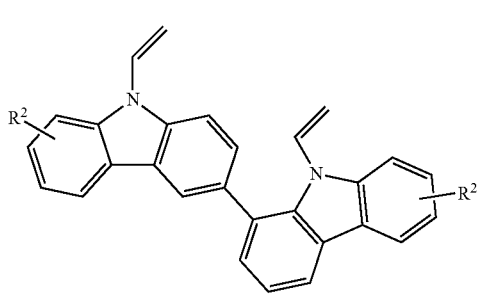

I-3

I-4

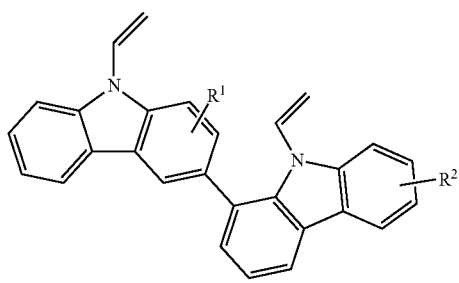

I-5

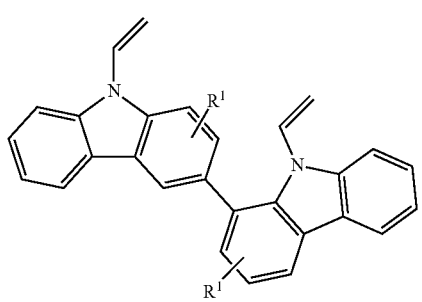

(in the formulae, $R^1$ and $R^2$ each independently represent a hydrogen atom, an alkyl group having 1 to 4 carbon atoms, an alkoxy group having 1 to 4 carbon atoms, a bromine atom, or a chlorine atom).

The compounds having acryloyl groups as $X^1$ and $X^2$ in the structural formula (1) include those represented by the following structural formulae (II-1) to (II-5):

[Chem. 6]

II-1

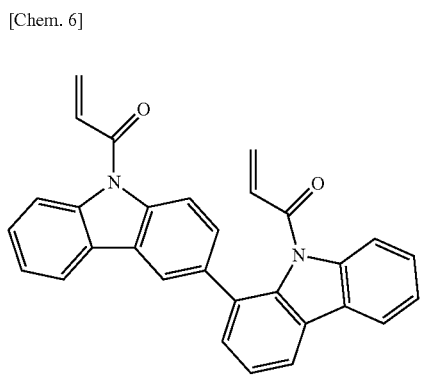

II-2

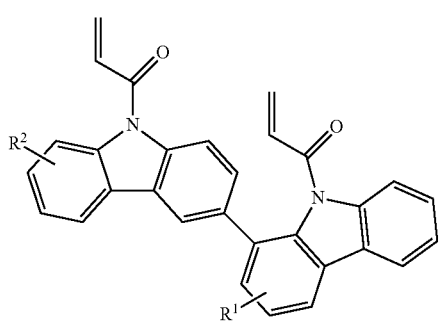

II-3

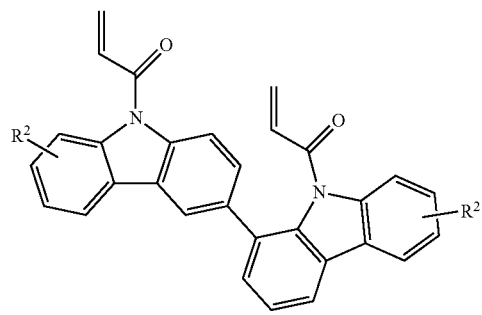

II-4

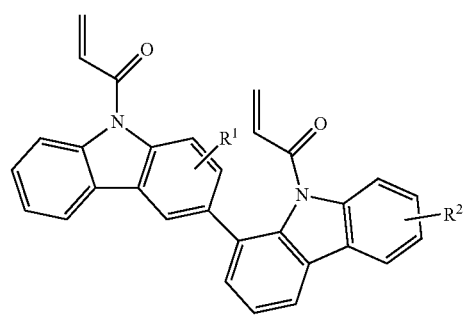

II-5

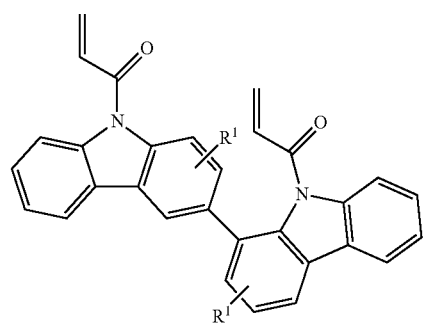

(in the formulae, $R^1$ and $R^2$ each independently represent a hydrogen atom, an alkyl group having 1 to 4 carbon atoms, an alkoxy group having 1 to 4 carbon atoms, a bromine atom, or a chlorine atom).

The compounds having methacryloyl groups as $X^1$ and $X^2$ in the structural formula (1) include those represented by the following structural formulae (III-1) to (III-5):

[Chem. 7]

III-1

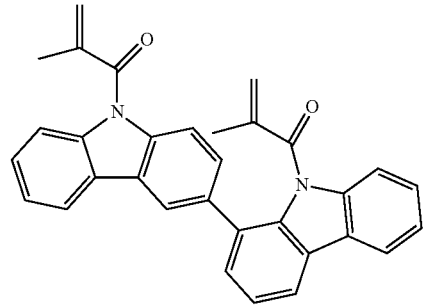

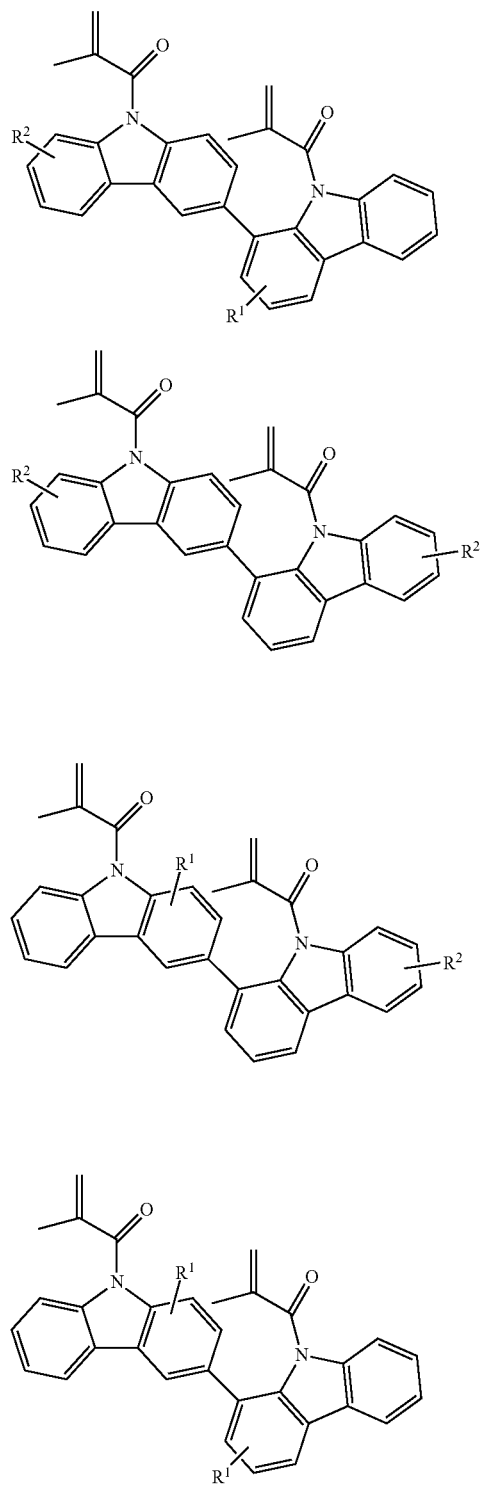

III-2

III-3

III-4

III-5

(in the formulae, $R^1$ and $R^2$ each independently represent a hydrogen atom, an alkyl group having 1 to 4 carbon atoms, an alkoxy group having 1 to 4 carbon atoms, a bromine atom, or a chlorine atom).

The compounds having acryloyloxyethyl groups as $X^1$ and $X^2$ in the structural formula (1) include those represented by the following structural formulae (IV-1) to (IV-5):

[Chem. 8]

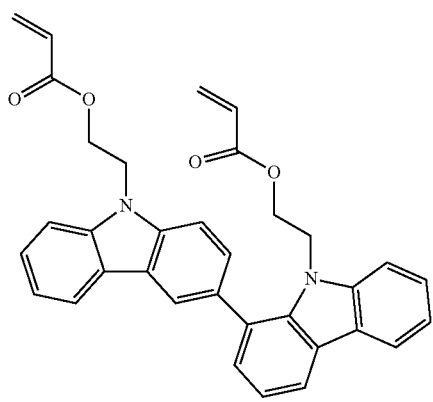

IV-1

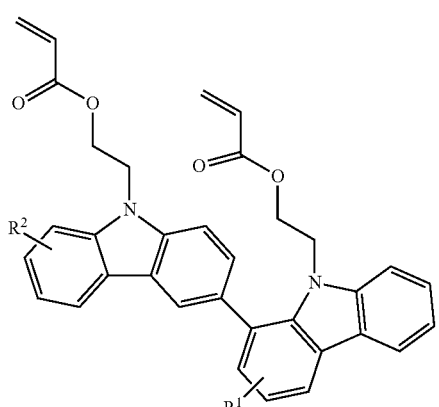

IV-2

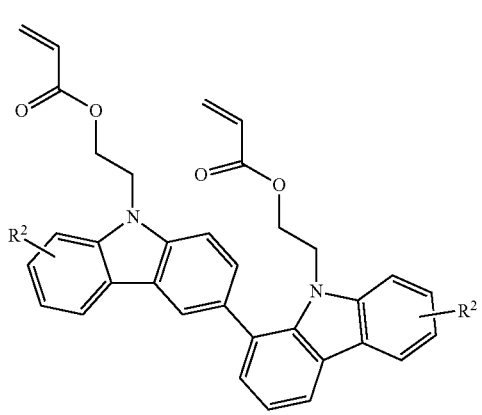

IV-3

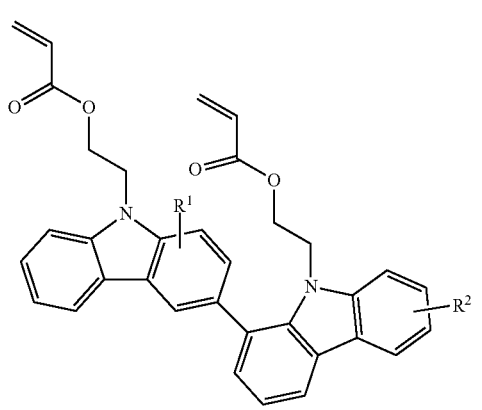

IV-4

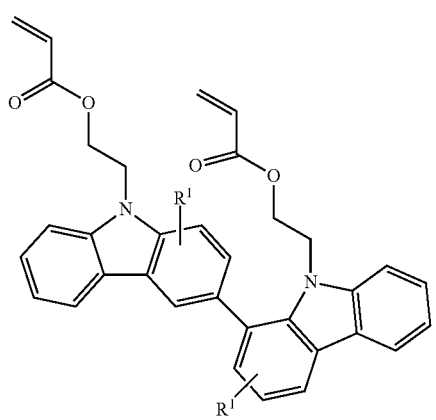

IV-5

(in the formulae, $R^1$ and $R^2$ each independently represent a hydrogen atom, an alkyl group having 1 to 4 carbon atoms, an alkoxy group having 1 to 4 carbon atoms, a bromine atom, or a chlorine atom).

The compounds having methacryloyloxyethyl groups as $X^1$ and $X^2$ in the structural formula (1) include those represented by the following structural formulae (V-1) to (V-5):

[Chem. 9]

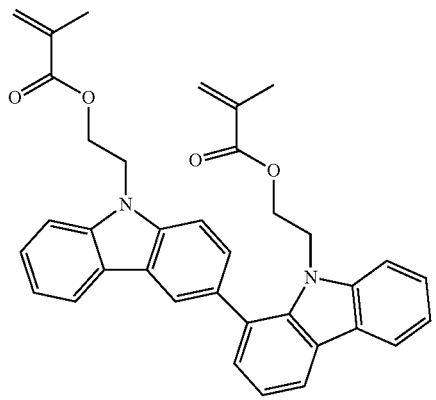

V-1

V-2

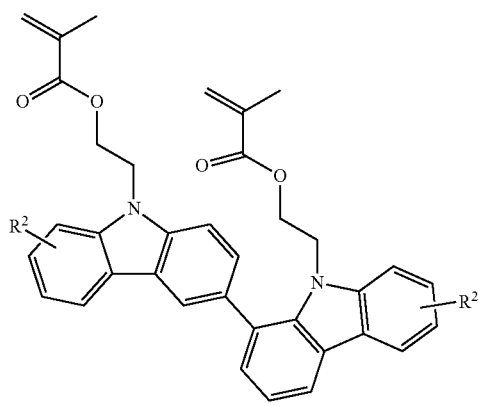

V-3

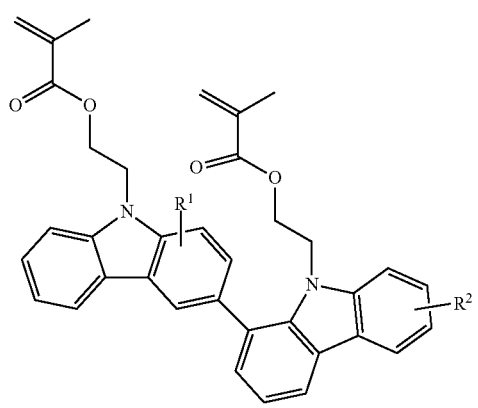

V-4

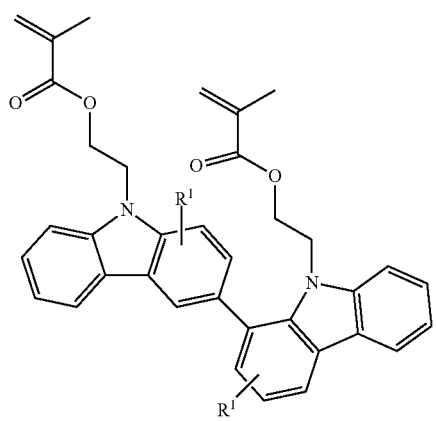

V-5

(in the formulae, $R^1$ and $R^2$ each independently represent a hydrogen atom, an alkyl group having 1 to 4 carbon atoms, an alkoxy group having 1 to 4 carbon atoms, a bromine atom, or a chlorine atom).

The compounds having glycidyl groups as $X^1$ and $X^2$ in the structural formula (1) include those represented by the following structural formulae (VI-1) to (VI-5):

[Chem.10]

VI-1
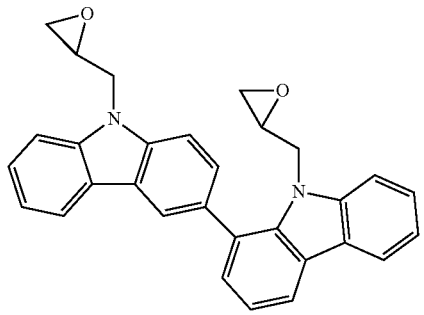

VI-2
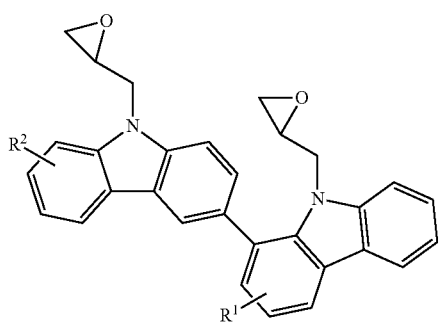

VI-3
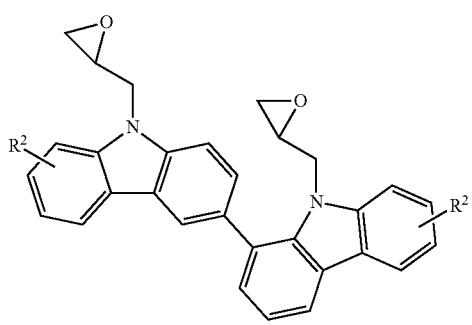

VI-4
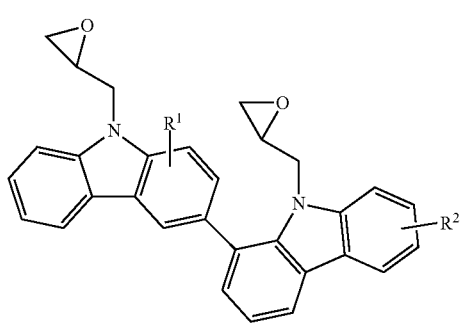

VI-5
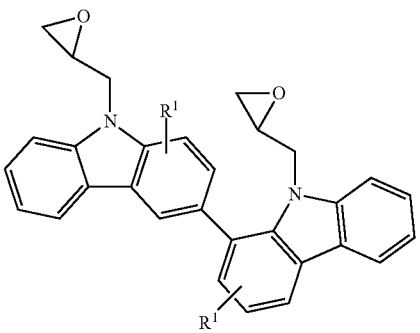

(in the formulae, $R^1$ and $R^2$ each independently represent a hydrogen atom, an alkyl group having 1 to 4 carbon atoms, an alkoxy group having 1 to 4 carbon atoms, a bromine atom, or a chlorine atom).

The compounds having 2-methylglycidyl groups as $X^1$ and $X^2$ in the structural formula (1) include those represented by the following structural formulae (VII-1) to (VII-5):

[Chem.11]

VII-1
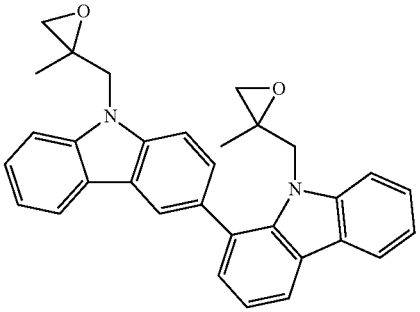

VII-2
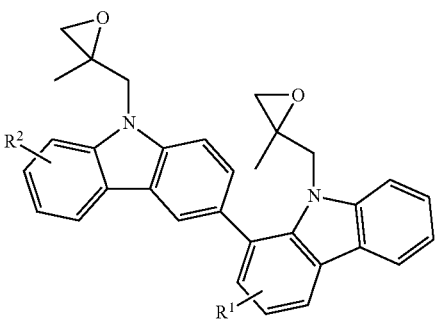

VII-3
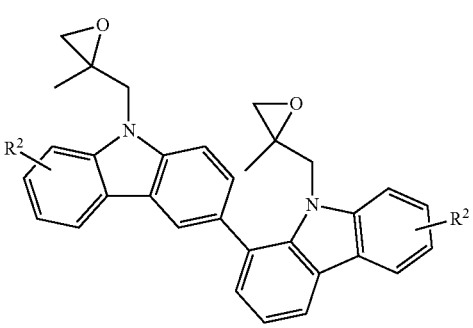

-continued

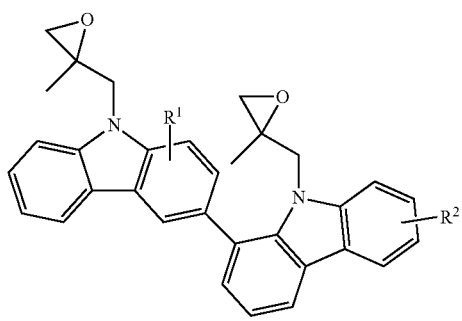
VII-4

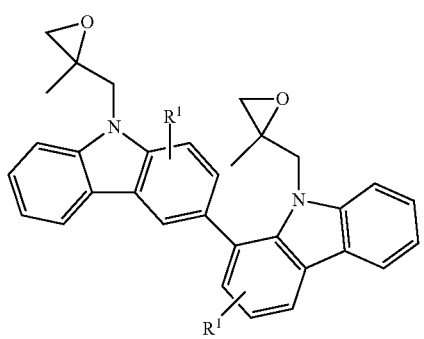
VII-5

(in the formulae, R¹ and R² each independently represent a hydrogen atom, an alkyl group having 1 to 4 carbon atoms, an alkoxy group having 1 to 4 carbon atoms, a bromine atom, or a chlorine atom).

The compounds having 3-ethyloxetanylmethyl groups as X¹ and X² in the structural formula (1) include those represented by the following structural formulae (VIII-1) to (VIII-5):

[Chem.12]

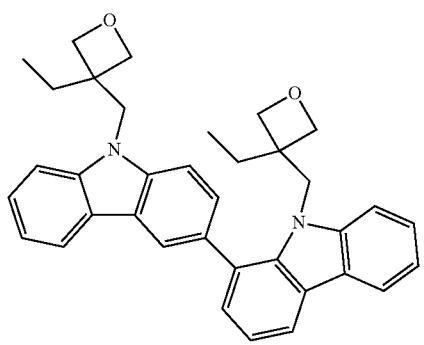
VIII-1

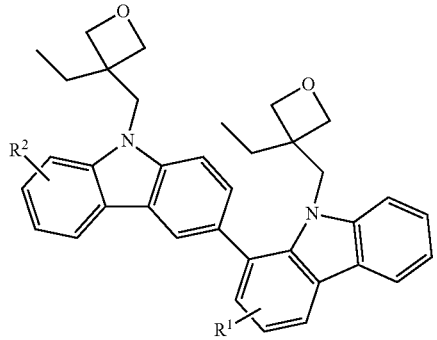
VIII-2

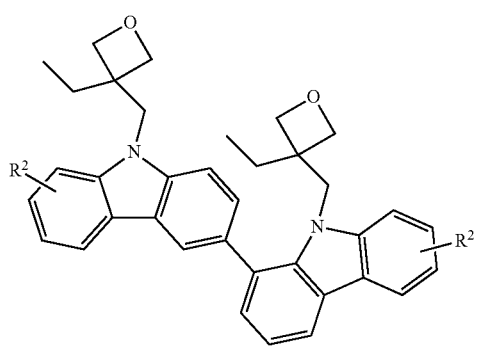
VIII-3

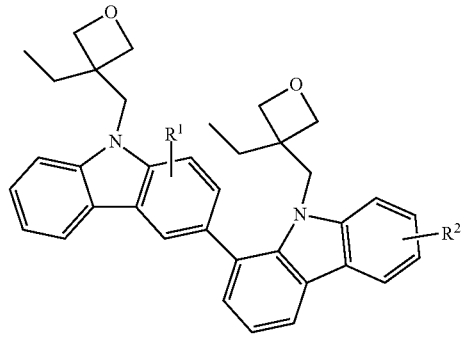
VIII-4

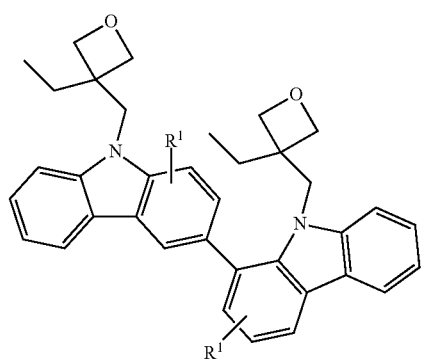
VIII-5

(in the formulae, R¹ and R² each independently represent a hydrogen atom, an alkyl group having 1 to 4 carbon atoms, an alkoxy group having 1 to 4 carbon atoms, a bromine atom, or a chlorine atom).

In the present invention, among them, compounds represented by the structural formulae (I-1) to (I-5) in which X¹ and X² in the structural formula (1) are vinyl groups, compounds represented by the structural formulae (II-1) to (II-5) in which X¹ and X² in the structural formula (1) are acryloyl groups, compounds represented by the structural formulae (III-1) to (III-5) in which $X^1$ and $X^2$ in the structural formula (1) are methacryloyl groups, compounds represented by the structural formulae (IV-1) to (IV-5) in which $X^1$ and $X^2$ in the structural formula (1) are acryloyloxyethyl groups are preferred in terms of excellent curability.

In addition, the bicarbazole compound (B) preferably has no substituent on the aromatic nuclei from the viewpoint of high refractive index, and thus compounds represented by the structural formulae (I-1), (II-1), or (III-1) are especially preferred.

The bicarbazole compound (B) can be produced, for example, by a method including:
a step (hereinunder abbreviated as "Step 1") of subjecting a 1,2,3,4-tetrahydrocarbazole represented by the following structural formula (3):

[Chem. 13]

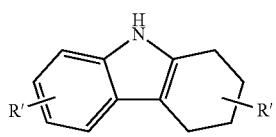

(3)

(in the formula, R' each independently represent a hydrogen atom, an alkyl group having 1 to 4 carbon atoms, an alkoxy group having 1 to 4 carbon atoms, a bromine atom, or a chlorine atom) to an oxidation reaction in the presence of an activated carbon to produce a bicarbazole intermediate (b1) represented by the following structural formula (4):

[Chem. 14]

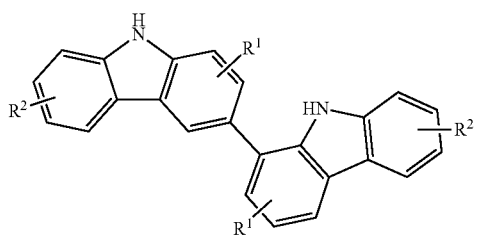

(4)

(in the formula, $R^1$ and $R^2$ each independently represent a hydrogen atom, an alkyl group having 1 to 4 carbon atoms, an alkoxy group having 1 to 4 carbon atoms, a bromine atom, or a chlorine atom); and
a step (hereinunder abbreviated as "Step 2") of introducing a photopolymerizable functional group or a structural moiety having a photopolymerizable functional group onto a nitrogen atom(s) in the intermediate (b1).

The activated carbon for use in Step 1 may be used alone or may be used as a so-called Pd—C catalyst including a catalyst, such as a palladium catalyst, supported on an activated carbon. The reaction temperature is not particularly limited, but is preferably a relatively high temperature in the range of 140 to 180° C. because the reaction proceeds rapidly.

The reaction in Step 1 is preferably performed in an organic solvent, and examples of organic solvents usable herein include benzene, xylene, 1,3,5-trimethylbenzene, and 1,2-dichlorobenzene.

In Step 1, the carbazole intermediate (b2) represented by the following structural formula (5):

[Chem. 15]

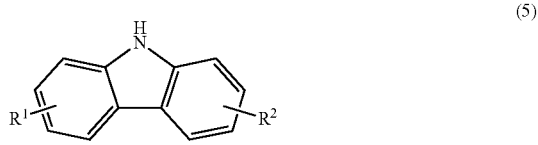

(5)

(in the formula $R^1$ and $R^2$ each independently represent a hydrogen atom, an alkyl group having 1 to 4 carbon atoms, an alkoxy group having 1 to 4 carbon atoms, a bromine atom, or a chlorine atom) is sometimes produced as a byproduct. In such a case, the reaction product of the Step (1) is preferably purified until the content of the carbazole intermediate (b2) in the reaction product becomes 15% by mass or less.

The reaction method for Step 2 of introducing a photopolymerizable functional group or a structural moiety having a photopolymerizable functional group onto a nitrogen atom(s) in the bicarbazole intermediate (b1) depends on the functional group to be introduced. For example, when a vinyl group is introduced, an example is a method of reacting ethylene carbonate with the reaction product of Step 1, and reacting the produced terminal hydroxyl group with p-toluenesulfonyl chloride to produce tosyl, followed by a detosylation reaction in the presence of a basic catalyst, to produce a vinyl group.

When an acryloyl group is introduced, an example is a method of reacting 3-chloropropionyl chloride with the reaction product of Step 1 to introduce a 3-chloropropionyl group, and then producing a double bond under a basic catalyst.

When a structural moiety represented by the structural formula (2) is introduced as a structural moiety having a photopolymerizable functional group of $X^1$ and $X^2$ in the structural formula (1), an example is a method of reacting an alkylene carbonate with the reaction product of the Step (1), further reacting an alkylene oxide therewith, as needed, according to an ordinary method to produce a terminal hydroxy group, and then reacting (meth)acrylic acid under a basic catalyst.

In addition, when a structural moiety having an oxetanyl group, such as a 3-methyloxetanyl-methyl group or a 3-ethyloxetanyl-methyl group, is introduced as a structural moiety having a photopolymerizable functional group of $X^1$ and $X^2$ in the structural formula (1), an example is a method of reacting a 3-chloromethyl-3-alkyloxetane with the reaction product of Step 1 under a basic catalyst.

When the bicarbazole compound (B) is produced by such a method, besides the bicarbazole compound (B), a carbazole compound (B') represented by the following structural formula (6):

[Chem. 16]

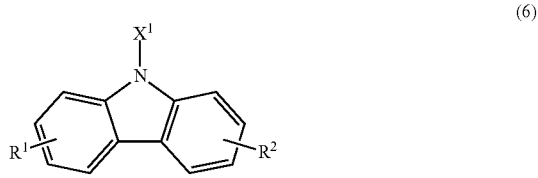

(6)

(in the formula, $X^1$ is a photopolymerizable functional group, a structural moiety having a photopolymerizable functional group, or a hydrogen atom, and $R^1$ and $R^2$ are each independently a hydrogen atom, an alkyl group having 1 to 4 carbon atoms, an alkoxy group having 1 to 4 carbon atoms, a bromine atom, or a chlorine atom) is sometimes produced as a byproduct. In this case, the content of the carbazole compound (B') in 100 parts by mass of the reaction product is preferably 30% by mass or less.

In the active energy ray-curable composition of the present invention, the other active energy ray-curable compound (D) may be used in combination with the bicarbazole compound (B). In particular, a phenylbenzyl (meth)acrylate (D1) is preferably used as the other compound (D). Combination use therewith provides an active energy ray-curable composition having a high refractive index while having a lower viscosity.

The phenylbenzyl (meth)acrylates (D1) include o-phenylbenzyl (meth)acrylate, m-phenylbenzyl (meth)acrylate, and p-phenylbenzyl (meth)acrylate. As the phenylbenzyl (meth)acrylate (D1) of the present invention, these compounds may be used alone or in combination of two or more thereof. Among them, o-phenylbenzyl (meth)acrylate and m-phenylbenzyl (meth)acrylate, which each have a liquid refractive index at 25° C. of 1.57 or higher and a viscosity of 30 mPa·s or lower, are preferred in terms of having a relatively high refractive index with a low viscosity. In addition, p-phenylbenzyl acrylate is preferred in terms of, despite being solid at normal temperature, having a significantly high liquid refractive index at 40° C. of 1.59 or higher.

In particular, o-phenylbenzyl (meth)acrylate, m-phenylbenzyl (meth)acrylate, and p-phenylbenzyl (meth)acrylate are preferably used in combination because of providing an active energy ray-curable composition having a high refractive index and a low viscosity. Regarding the blend ratio thereof, the molar ratio of the sum of o-phenylbenzyl (meth)acrylate and m-phenylbenzyl (meth)acrylate to p-phenylbenzyl (meth)acrylate, [{(o-phenylbenzyl (meth)acrylate)+(m-phenylbenzyl (meth)acrylate)}/(p-phenylbenzyl (meth)acrylate)], is preferably in the range of 55/45 to 10/90.

In addition, o-phenylbenzyl (meth)acrylate and p-phenylbenzyl (meth)acrylate are preferred in terms of their easy production. Regarding the blend ratio in the case of using these two components, the molar ratio of o-phenylbenzyl (meth)acrylate to p-phenylbenzyl (meth)acrylate, [(o-phenylbenzyl (meth)acrylate)/(p-phenylbenzyl (meth)acrylate)], is preferably in the range of 55/45 to 10/90 because of providing an active energy ray-curable composition having a high refractive index and a low viscosity.

Examples of methods for producing the phenylbenzyl (meth)acrylate (D1) include a method of performing an esterification reaction of biphenyl methanol and (meth)acrylic acid (Method 1) and a method of reacting a (halogenated methyl) biphenyl, such as chloromethylbiphenyl or bromomethylbiphenyl, with a salt of (meth)acrylic acid and an alkali metal such as potassium, sodium, or lithium (Method 2), and a method of reacting biphenyl, a hydrogen halide, and a formaldehyde derivative, then further reacting the resulting reaction mixture with acrylic acid or an acrylic acid alkali metal salt (Method 3).

In the above Method 3, the ratio of biphenyl and formaldehyde used for the reaction is preferably in the range of 1 to 25 mol of formaldehyde per mol of biphenyl. Formaldehyde may be used in any form, such as an aqueous formalin solution, paraformaldehyde, or trioxane. The hydrogen halides include, for example, a concentrated hydrochloric acid and hydrogen chloride gas, and the hydrogen halide is preferably used in an excess molar ratio relative to biphenyl. The reaction is preferably performed under an acid catalyst condition, and the acid catalyst to be used may be, for example, sulfuric acid, phosphoric acid, polyphosphoric acid, trichloroacetic acid, dichloroacetic acid, monochloroacetic acid, methanesulfonic acid, p-toluenesulfonic acid, or a Lewis acid such as zinc chloride. The reaction may be performed in an organic solvent, such as dimethoxyethane, dioxane, cyclopentyl methyl ether, or acetic acid, as needed, and the reaction temperature is preferably in the range of 60 to 180° C.

In production of the phenylbenzyl (meth)acrylate (D1) by such a method, besides the phenylbenzyl (meth)acrylate (D1), bis[(meth)acryloylmethyl]biphenyl (D1'), a biphenyl compound having a molecular structure including biphenyl structures linked via methylene (D1"), and the like are sometimes produced as byproducts. In this case, the content of the phenylbenzyl (meth)acrylate (D1) in 100 parts by mass of the reaction product is preferably in the range of 30 to 95 parts by mass, and more preferably in the range of 35 to 85 parts by mass. In addition, the content of the bis[(meth)acryloylmethyl]biphenyl (D1') in 100 parts by mass of the reaction product is preferably in the range of 5 to 70 parts by mass, and more preferably in the range of 15 to 65 parts by mass. Further, the content of the biphenyl compound having a molecular structure including biphenyl structures linked via methylene (D1") in 100 parts by mass of the reaction product is preferably in the range of 0.5 to 30 parts by mass, and more preferably in the range of 1 to 25 parts by mass.

In addition, in production of the phenylbenzyl (meth)acrylate (D1) by such a method, an unreacted portion of the starting material biphenyl sometimes remains in the reaction product. In this case, the content of biphenyl in 100 parts by mass of the reaction product is preferably in the range of 0.5 to 15 parts by mass, and more preferably in the range of 1 to 10 parts by mass because of providing a composition having a high refractive index and a low viscosity, which is the desired effect of the present invention.

A method for measuring a content of each component in the reaction product may be, for example, gas chromatography, liquid chromatography, or gel permeation chromatography.

Examples of the bis[(meth)acryloylmethyl]biphenyls (D1') include 2,2'-bis(acryloylmethyl)-1,1'-biphenyl, 3,3'-bis(acryloylmethyl)-1,1'-biphenyl, 4,4'-bis(acryloylmethyl)-1,1'-biphenyl, 2,4'-bis(acryloylmethyl)-1,1'-biphenyl, 2,4-bis(acryloylmethyl)-1,1'-biphenyl, and 2,6-bis(acryloylmethyl)-1,1'-biphenyl.

The biphenyl compound having a molecular structure including biphenyl structures linked via methylene (D1") preferably has a number of the biphenyl structural units contained in the molecular structure in the range of 2 to 5. A method for identifying the polymerization degree in the biphenyl compound (D1") may be, for example, a method in which the phenylbenzyl (meth)acrylate (A) and the bis(acryloylmethyl)biphenyl (D1') are removed from the reaction product by silica gel column chromatography, and the remaining components are analyzed using a gas chromatography-mass spectrometer (GC-MS) or a high performance liquid chromatography-mass spectrometer (LC-MS).

Examples of the compounds used as the other compound (D) besides the phenylbenzyl (meth)acrylate (D1) include epoxy(meth)acrylate, a fluorene backbone-containing di(meth)acrylate, a (meth)acrylate having a polyoxyalkylene structure, a monofunctional (meth)acrylate monomer, and a polyfunctional (meth)acrylate monomer.

The epoxy(meth)acrylate is specifically produced through a reaction of an epoxy resin with (meth)acrylic acid or anhydride thereof, and examples of epoxy resins include diglycidyl ethers of dihydric phenols, such as hydroquinone and catechol; diglycidyl ethers of biphenol compounds, such as 3,3'-biphenyldiol and 4,4'-biphenyldiol; bisphenol-type epoxy resins, such as a bisphenol A-type epoxy resin, a bisphenol B-type epoxy resin, a bisphenol F-type epoxy resin, and a bisphenol S-type epoxy resin; polyglycidyl ethers of naphthol compounds, such as 1,4-naphthalenediol, 1,5-naphthalenediol, 1,6-naphthalenediol, 2,6-naphthalenediol, 2,7-naphthalenediol, binaphthol, and bis(2,7-dihydroxynaphthyl)methane; triglycidyl ethers, such as 4,4',4''-methylidynetrisphenol; novolac-type epoxy resins, such as a phenol novolac-type epoxy resin and a cresol novolac resin;

polyglycidyl ethers of polyether-modified aromatic polyols produced through ring-opening polymerization of a biphenol compound as mentioned above, bisphenol A, bisphenol B, bisphenol F, bisphenol S, or a naphthol compound with various cyclic ether compounds such as ethylene oxide, propylene oxide, tetrahydrofuran, ethyl glycidyl ether, propyl glycidyl ether, butyl glycidyl ether, phenyl glycidyl ether, and allyl glycidyl ether; and polyglycidyl ethers of lactone-modified aromatic polyols produced through polycondensation of a biphenol compound as mentioned above, bisphenol A, bisphenol B, bisphenol F, bisphenol S, or a naphthol compound with a lactone compound, such as ε-caprolactone.

Among them, compounds having an aromatic backbone in the molecular structure are preferred in that the finally resulting composition has a high refractive index. In particular, the bisphenol-type epoxy resins and the polyglycidyl ethers of naphthol compounds are preferred, and the bisphenol-type epoxy resins are particularly preferred because of having a higher refractive index and providing a cured coating which has high adhesiveness to plastic film substrates even under high-temperature and high-humidity conditions.

Among the bisphenol-type epoxy resins, compounds having an epoxy equivalent in the range of 160 to 1,000 g/eq are preferred, and compounds having that in the range of 165 to 600 g/eq are more preferred because of providing a cured product which has a higher refractive index and a higher hardness.

Specific examples of the fluorene backbone-containing di(meth)acrylates include compounds represented by the following structural formula (7):

[Chem. 17]

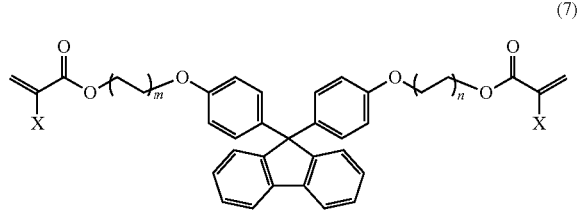

(7)

(in the formula, X is a hydrogen atom or a methyl group, and m and n each independently represent an integer of 0 to 5).

The aforementioned (meth)acrylate compound having a polyoxyalkylene structure has a polyoxyalkylene structure, such as a polyethylene glycol chain or a polypropylene glycol chain, in the molecular structure, and examples thereof include a diacrylate of a polyethylene glycol having 4 to 15 ethylene oxide units, a monoacrylate of a polyethylene glycol having 4 to 15 ethylene oxide units, a diacrylate of a polypropylene glycol having 4 to 15 propylene oxide units, a monoacrylate of a polypropylene glycol having 4 to 15 propylene oxide units, an ethylene oxide-modified glycerol triacrylate (3 to 10 EO units), a propylene oxide-modified glycerol triacrylate (3 to 10 PO units), an ethylene oxide-modified trimethylolpropane triacrylate (4 to 20 EO units), a propylene oxide-modified trimethylolpropane triacrylate (4 to 20 PO units), a diacrylate of a bisphenol ethylene oxide adduct having 4 to 15 ethylene oxide units, and a diacrylate of a bisphenol propylene oxide adduct having 4 to 15 propylene oxide units.

Next, examples of other monofunctional (meth)acrylate monomers include monofunctional (meth)acrylates, such as n-butyl (meth)acrylate, isobutyl (meth)acrylate, tert-butyl (meth)acrylate, n-pentyl (meth)acrylate, n-hexyl (meth)acrylate, n-octyl (meth)acrylate, isooctyl (meth)acrylate, 2-ethylhexyl (meth)acrylate, benzyl (meth)acrylate, phenoxyethyl (meth)acrylate, phenylthioethyl (meth)acrylate, o-phenylphenoxyethyl (meth)acrylate, naphthoxyethyl (meth)acrylate, naphthylthioethyl (meth)acrylate, phenoxydiethylene glycol (meth)acrylate, glycidyl (meth)acrylate, morpholine (meth)acrylate, 2-hydroxyethyl (meth)acrylate, 2-hydroxypropyl (meth)acrylate, 4-hydroxybutyl (meth) acrylate, diethylene glycol mono(meth)acrylate, triethylene glycol mono(meth)acrylate, dipropylene glycol mono(meth) acrylate, 2-methoxyethyl (meth)acrylate, methoxydiethylene glycol (meth)acrylate, methoxytriethylene glycol (meth) acrylate, methoxypolyethylene glycol (meth)acrylate, 2-butoxyethyl (meth)acrylate, butoxytriethylene glycol (meth)acrylate, 2-ethoxyethyl (meth)acrylate, 2-(2-ethoxyethoxy)ethyl (meth)acrylate, ethoxypolyethylene glycol (meth)acrylate, 4-nonylphenoxyethylene glycol (meth)acrylate, tetrahydrofurfuryl (meth)acrylate, caprolactone-modified tetrahydrofurfuryl (meth)acrylate, cyclohexyl (meth) acrylate, isobornyl (meth)acrylate, 2-hydroxy-3-phenoxypropyl (meth)acrylate, cyclohexyl (meth)acrylate, cyclohexylmethyl (meth)acrylate, cyclohexylethyl (meth) acrylate, dicyclopentanyl (meth)acrylate, dicyclopentanyloxyethyl (meth)acrylate, dicyclopentenyl (meth)acrylate, dicyclopentenyloxyethyl (meth)acrylate, and phenylphenoxyethyl acrylate.

Examples of polyfunctional (meth)acrylate monomers include bifunctional (meth)acrylates, such as ethylene glycol di(meth)acrylate, diethylene glycol di(meth)acrylate, triethylene glycol di(meth)acrylate, polyethylene glycol di(meth) acrylate, propylene glycol di(meth)acrylate, dipropylene glycol di(meth)acrylate, tripropylene glycol di(meth)acrylate, butylene glycol di(meth)acrylate, tetrabutylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, a di(meth)acrylate of a bisphenol F ethylene oxide adduct, a di(meth)acrylate of a bisphenol F propylene oxide adduct, dicyclopentanyl di(meth)acrylate, glycerol di(meth)acrylate, neopentyl glycol hydroxypivalic acid ester di(meth)acrylate, caprolactone-modified hydroxypivalic acid neopentyl glycol di(meth)acrylate, tetrabromobisphenol A di(meth)acrylate, hydropivalaldehyde-modified trimethylolpropane di(meth) acrylate, and 1,4-cyclohexanedimethanol di(meth)acrylate; trifunctional (meth)acrylates, such as trimethylolpropane tri(meth)acrylate, a tri(meth)acrylate of a trimethylolpropane ethylene oxide adduct, a tri(meth)acrylate of a trimethylolpropane propylene oxide adduct, pentaerythritol tri (meth)acrylate, glycerol tri(meth)acrylate, and a tri(meth)

acrylate of an alkyl-modified dipentaerythritol; tetrafunctional (meth)acrylates, such as ditrimethylolpropane tetra(meth)acrylate, a tetra(meth)acrylate of a ditrimethylolpropane ethylene oxide adduct, and a tetra(meth) acrylate of a ditrimethylolpropane propylene oxide adduct.

When the other compound (D) is used, the blend ratio of the bicarbazole compound (B) and the other compound (D) is not particularly limited, and may be appropriately adjusted according to the desired viscosity and refractive index. In particular, the content of the bicarbazole compound (B) in the total mass of the bicarbazole compound (B) and the other compound (D) is preferably in the range of 15 to 95% by mass, and more preferably in the range of 20 to 85% by mass because the high refractive index, which is a feature of the bicarbazole compound (B), can be sufficiently utilized.

In the present invention, a dispersant (E) may be used to further increase the dispersion stability of the zirconium oxide nanoparticles (A). The dispersant (E) is not particularly limited as long as it is a compound containing a functional group having affinity with the zirconium oxide nanoparticles (A). Examples thereof include anionic dispersants having an acid group, such as a carboxylic acid, sulfuric acid, a sulfonic acid, phosphoric acid, and salts of the acid compounds. Among them, because of providing an active energy ray-curable composition having further increased dispersion stability, phosphate ester-based dispersants are preferred, and those having a lactone compound-derived structural moiety are more preferred. In addition, preferably, the acid value thereof is in the range of 100 to 300 mg KOH/g, and more preferably, the weight average molecular weight (Mw) is in the range of 1,000 to 3,000.

Incidentally, in the present invention, a mass average molecular weight (Mw) is a value obtained by measurement using gel permeation chromatography (GPC) under the following conditions.

Measuring instrument; HLC-8220, manufactured by TOSOH Corporation

Column; guard column HXL-H, manufactured by TOSOH Corporation

TSKgel G5000HXL, manufactured by TOSOH Corporation

TSKgel G4000HXL, manufactured by TOSOH Corporation

TSKgel G3000HXL, manufactured by TOSOH Corporation

TSKgel G2000HXL, manufactured by TOSOH Corporation

Detector; RI (differential refractometer)

Data processor: SC-8010, manufactured by TOSOH Corporation

Measurement conditions: column temperature: 40° C.

Solvent: tetrahydrofuran

Flow rate: 1.0 ml/min

Reference: polystyrene

Sample: a 0.4 mass % tetrahydrofuran solution in terms of resin solid was filtered through a microfilter (100 μl)

When the dispersant (E) is used, the amount thereof is preferably in the range of 0.1 to 30% by mass relative to the total mass of the zirconium oxide particles (a), and more preferably in the range of 0.5 to 15% by mass.

The active energy ray-curable composition of the present invention further contains a radical polymerization initiator (F). The radical polymerization initiators include, for example, 1-hydroxycyclohexyl phenyl ketone, 2-hydroxy-2-methyl-1-phenylpropan-1-one, 1-[4-(2-hydroxyethoxy) phenyl]-2-hydroxy-2-methyl-1-propan-1-one, thioxanthone and thioxanthone derivatives, 2,2'-dimethoxy-1,2-diphenylethan-1-one, 2,4,6-trimethylbenzoyldiphenylphosphine oxide, bis(2,4,6-trimethylbenzoyl)phenylphosphine oxide, 2-methyl-1-[4-(methylthio)phenyl]-2-morpholino-1-propanone, and 2-benzyl-2-dimethylamino-1-(4-morpholinophenyl)-butan-1-one.

Examples of commercial products of the radical polymerization initiators include "Irgacure-184", "Irgacure-149", "Irgacure-261", "Irgacure-369", "Irgacure-500", "Irgacure-651", "Irgacure-754", "Irgacure-784", "Irgacure-819", "Irgacure-907", "Irgacure-1116", "Irgacure-1664", "Irgacure-1700", "Irgacure-1800", "Irgacure-1850", "Irgacure-2959", "Irgacure-4043", and "Darocure-1173" (manufactured by Chiba Specialty Chemicals); "Lucirin TPO" (manufactured by BASF); "Kayacure-DETX", "Kayacure-MBP", "Kayacure-DMBI", "Kayacure-EPA", and "Kayacure-OA" (manufactured by Nippon Kayaku); "Vicure-10" and "Vicure-55" (manufactured by stauffer chemical); "Trigonal P1" (manufactured by Akzo); "Sandrei 1000" (manufactured by Sandoz); "Deap" (manufactured by Upjohn); and "Quantacure-PDO", "Quantacure-ITX", and "Quantacure-EPD" (manufactured by Ward Blenkinsop).

For exhibiting a sufficient curability, the radical polymerization initiator is preferably contained in the range of 0.05 to 20 parts by mass, and more preferably contained in the range of 0.1 to 10 parts by mass, relative to 100 parts by mass of the active energy ray-curable composition of the present invention.

When the active energy ray-curable composition of the present invention is cured by photopolymerization, various photosensitizers may be added in combination with the aforementioned radical polymerization initiator. The photosensitizers include, for example, amines, ureas, sulfur-containing compounds, phosphorus-containing compounds, chlorine-containing compounds, and nitriles and other nitrogen-containing compounds, and the compounds may be used alone or in combination of two or more thereof. The addition amount of the photosensitizer, if added, is preferably in the range of 0.01 to 10 parts by mass relative to 100 parts by mass of the active energy ray-curable composition of the present invention.

The active energy ray-curable composition of the present invention may contain various other additives as required. Examples of additives include a UV absorber, an antioxidant, a silicone-based additive, a fluorine-based additive, a rheology controlling agent, an antifoaming agent, an antistatic agent, and an antifogging agent. The addition amount of such an additive, if added, is in the range of 0.01 to 40 parts by mass relative to 100 parts by mass of the active energy ray-curable composition of the present invention so that the additive sufficiently exhibits its effect and does not impair the UV curing.

The viscosity of the active energy ray-curable composition of the present invention is preferably 6,000 mPa·s or less in that the active energy ray-curable resin composition spreads to details of a mold without failure even under rapid coating conditions.

The method for producing the active energy ray-curable composition of the present invention is not particularly limited, but the composition can be adjusted, for example, by a method of dispersing raw materials including the zirconium oxide particles (a), the a bicarbazole compound (B), the other compound (D), the dispersant (E), and the like all at once (Method 1), a method of dispersing the zirconium oxide particles (a) in an organic solvent, adding other components thereto, followed by mixing, and then optionally removing the organic solvent under reduced pressure (Method 2), or the like.

As a disperser used in the Methods 1 and 2, a generally known disperser, such as a media-type wet disperser, may be used without any limitation, and examples of dispersers include bead mills (Star mill LMZ-015, manufactured by Ashizawa Finetech Ltd., Ultra Apex Mill UAM-015 manufactured by Kotobuki Kogyo, and the like).

As media used in a disperser, generally known beads can be used with no particular limitation, but preferred examples include zirconia, alumina, silica, glass, silicon carbide, and silicon nitride. The media preferably have a mean particle size of 50 to 500 μm, and more preferably 100 to 200 μm. With a particle size of 50 μm or more, the impact on the raw material powder is suitable and therefore an excessive time is not required. On the other hand, when the particle size of the media is 500 μm or less, the impact on the raw material powder is suitable and therefore increase in surface energy of the dispersed particles can be suppressed to prevent re-aggregation.

In addition, the time for dispersion process may be shortened by using a two-stage method in which media having a large particle size, which have a large impact force, are used in a first step of the dispersion, and after the particle size of the dispersed particles becomes small, media having a small particle size, which does not easily cause re-aggregation, are used.

The active energy ray to be applied to cure the active energy ray-curable composition of the present invention may be, for example, an electron ray, an ultraviolet ray, or a visible ray. When an electron ray is used as the active energy ray, the curable composition of the present invention can be cured using an electron ray generator, such as a Cockcroft-Walton accelerator, a Van de Graaff accelerator, a resonance transformer accelerator, and an insulating core transformer-type, a dynamitron-type, a linear filament-type, and a high frequency-type generator. In addition, when an ultraviolet ray is used as the active energy ray, the curable composition can be cured by irradiation with a mercury lamp, such as a super high pressure mercury lamp, a high pressure mercury lamp, or a low pressure mercury lamp, a xenon lamp, a carbon arc lamp, a metal Naito lamp, or the like. The exposure dose of the ultraviolet ray at this time is preferably in the range of 0.1 to 1,000 mJ/cm$^2$.

On the other hand, in curing by heating, curing can be achieved by heating at temperatures in the range of 60 to 250° C.

Since cured products of the active energy ray-curable composition of the present invention have higher refractive indices than ever, such cured products can be suitably used for various optical materials, for example, plastic lenses, such as a spectacle lens, a digital camera lens, a Fresnel lens, and a prism lens, optical over-coating agents, hard coating agents, antireflection films, optical fibers, optical waveguides, holograms, prism lenses, LED sealing materials, and solar cell coatings. Among them, the cured products are particularly suited for plastic lenses, such as a prism lens for liquid crystal substrates.

The prism lens for liquid crystal substrates is a sheet-like lens including a plurality of fine prism-shaped portions on one surface of a sheet-like molded article. The sheet-like lens is generally placed on the back surface (on the light source side) of a liquid crystal display element so that the prism surface faces the element side, and further on the back surface of the sheet-like lens, a light guide sheet is provided. Alternatively, the prism lens may double as a light guide sheet.

Regarding the shape of the prism portions of the prism lens, the apex angle θ of each prism is preferably in the range of 70 to 110° in terms of excellent light concentration and increased luminance, and particularly preferably in the range of 75 to 100°, and more particularly preferably in the range of 80 to 95°.

In addition, the pitch of the prisms is preferably 100 μm or less, and in terms of prevention of moire patterns on a screen and increased definition of a screen, the pitch is particularly preferably in the range of 70 μm or less. In addition, the height of the unevenness by the prisms, which is determined by the apex angle θ of each prism and the pitch value of the prisms, is preferably in the range of 50 μm or less. Furthermore, the sheet thickness of the prism lens is preferably larger in terms of the strength, whereas preferably smaller from an optical viewpoint because of suppressing the light absorption. In terms of the balance thereof, the thickness is preferably in the range of 50 μm to 1000 μm.

An example of a method for producing the prism lens using the active energy ray-curable composition of the present invention is a method in which the composition is applied on a mold, such as a metal mold or a resin mold, having a prism pattern formed thereon, a transparent substrate is superimposed on a surface, which is smoothened in advance, of the composition, and an active energy ray is applied from the transparent substrate side to cure the composition.

Examples of the transparent substrates used herein include: plastic substrates made of an acrylic resin, a polycarbonate resin, a polyester resin, a polystyrene resin, a fluorine resin, or a polyimide resin; and glasses.

The prism sheet produced by the above method may be used as it is, or the prism lens may be used alone after the transparent substrate is released. If the prism sheet is used in the state where prism portions remain formed on the transparent substrate, preferably the surface of the transparent substrate is previously subjected to an adhesiveness-increasing treatment, such as a primer treatment, for the purpose of increasing the adhesiveness between the prism lens and the transparent substrate.

On the other hand, when the transparent substrate is released before use, preferably the surface of the transparent substrate is previously treated with a silicone- or fluorine-based release agent for easy release of the transparent substrate.

When the active energy ray-curable composition of the present invention is used as an optical material for use in the prism lens or the like, a cured product thereof preferably has a refractive index of 1.5500 or more, and more preferably 1.5700 or more.

EXAMPLES

The present invention will be described in more detail below by examples and comparative examples.

Details of the components and disperser used in Production Examples and Examples are as follows.

TABLE 1

| | |
|---|---|
| Zirconium oxide particles (a1) | "UEP-100 (surface-untreated type)" manufactured by Daiichi Kigenso Kagaku Kogyo Co. Ltd., primary particle size: 11 nm |

TABLE 1-continued

| | |
|---|---|
| VBIC (B1) | Bicarbazole compound (B1) produced in Production Example 2 |
| Silane coupling agent (C1) | "KBM-503" manufactured by Sin-Etsu Chemical Co. Ltd., 3-(meth)acryloyloxypropyltrimethoxysilane |
| PBA (D1) | Phenylbenzyl acrylate composition (D1) produced in Production Example 3 |
| Fluorene compound (D2) | "A-BPEF" manufactured by Shin-Nakamura Chemical Co., Ltd, 9,9-bis[4-(2-acryloyloxyethoxy)phenyl]fluorene |
| Dispersant (E1) | "DISPERBYK-111" manufactured by BYK, phosphate ester-based dispersant, acid value: 130 mg KOH/g, weight average molecular weight (Mw): 1400 |
| Polymerization initiator | "Lucirin TPO" manufactured by BASF Japan, 2,4,6-trimethylbenzoyldiphenylphosphine oxide |
| Media-type wet disperser | "Star mill LMZ-015" manufactured by Ashizawa Finetech Ltd. 2,4,7-trimethylbenzoyldiphenylphosphine oxide |

Production Example 1: Production of Zirconium Dispersion 50 g of zirconium oxide particles (a1), 7.5 g of silane coupling agent (C1), 183.0 g of methyl ethyl ketone were mixed and stirred by a dispersion stirrer for 30 minutes to perform rough dispersion. The resulting mixture was subjected to a dispersion treatment by the media-type wet disperser with zirconia beads having a particle size of 100 µm. While checking the particle size along the way, the dispersion treatment is continued for a retention time of 100 minutes, and then 5 g of a dispersant (E1) was added and mixed, followed by a further dispersion treatment for 20 minutes, to give a zirconium dispersion.

Production Example 2: Production of Bicarbazole Compound (B1)

Production of 1,3'-Bicarbazole Intermediate

Into a reaction vessel, 300 g (1.75 mol) of 1,2,3,4-tetrahydrocarbazole, 300 g of an activated carbon, and 2500 g of 1,2-dichlorobenzene were charged, and the mixture was subjected to a reaction under a temperature condition of 140 to 170° C. with air bubbling (120 to 150 L/hr) for 36 hours. After complete consumption of 1,2,3,4-tetrahydrocarbazole as a starting material was confirmed by high performance liquid chromatography, the activated carbon was removed by filtration, and the product was concentrated. The concentrated product was washed with ethanol at 70° C. over 3 hours, and the suspension was filtered and dried to give a crude product. The crude product was purified by column chromatography, and then washed with dichloromethane at room temperature over 3 hours to yield 8.7 g of 1,3'-bicarbazole intermediate having a purity of 90% by mass (here, the remaining 10% by mass was carbazole).

Acrylation 5.0 g (15 mmol) of the 1,3'-bicarbazole intermediate having a purity of 90% by mass obtained above was suspended into 45.4 g (358 mmol) of 3-chloropropionyl chloride, and the suspension was subjected to a reaction at 130° C. for 8 hours while hydrogen chloride gas generated was discharged with nitrogen flow. The reaction mixture was cooled to room temperature, and 200 ml of toluene was added to dissolve the product. The solution was washed with water twice, with a saturated sodium hydrogen carbonate solution once, and with a saturated sodium chloride solution once in this order, and dried over anhydrous magnesium sulfate. The solvent was removed by distillation under reduced pressure, followed by purification by silica gel column chromatography (n-heptane:ethyl acetate=9:1), to yield 6.5 g of 9,9'-bis(3-chloropropionyl)-1,3'-bicarbazole as white crystals.

Next, in a 300 ml three-neck flask, 6.0 g of 9,9'-bis(3-chloropropionyl)-1,3'-bicarbazole and 0.2 g of 4-methoxyphenol were dissolved in 60 ml of toluene. To this solution, 2.37 g (23.4 mmol) of triethylamine was added with stirring, followed by a reaction at 60° C. for 4 hours. The reaction solution was cooled to room temperature, 200 ml of toluene was added thereto, and washed with saturated aqueous sodium chloride once, with 2% hydrochloric acid once, with saturated aqueous sodium hydrogen carbonate once, and with saturated aqueous sodium chloride once in this order. After drying over anhydrous magnesium sulfate, the solvent was removed by distillation under reduced pressure, and the resulting crude product was purified by silica gel column chromatography (n-heptane:ethyl acetate=9:1) to yield 5.1 g of 9,9'-diacryloyl-1,3'-bicarbazole [hereinunder abbreviated as "bicarbazole compound (B1)"] as white crystals. FIG. 1 shows a 1H-NMR chart of the bicarbazole compound (B1). 1H-NMR was measured with a d6-DMSO solution of the sample using "Avance 400" (400 MHz) manufactured by Bruker. The bicarbazole compound (B-1) was measured for the mass spectrum, which confirmed the presence of peaks at m/z 440, 386, and 332. The mass spectrum was measured by "5937 MSD EI" manufactured by Agilent Technologies.

Production Example 3: Production of Phenylbenzyl Acrylate Composition (D1)

Synthesis of Chloro-Intermediate

Into a 5 L four-neck flask equipped with a stirrer, a condenser, a thermometer, and a hydrogen chloride gas introducer, 709 g of dipheny, 276 g of paraformaldehyde, 1,381 g of acetic acid, and 958 g of a concentrated hydrochloric acid were charged, and the mixture was heated to 80° C. After confirmation of the temperature of the starting solution being 80° C., hydrogen chloride gas was introduced to the starting solution at a rate of 20 g/hr using a Kinoshita-type glass ball filter. After confirmation of saturated dissolution of hydrogen chloride gas in the starting solution, 1,061 g of phosphoric acid was dropwise added over 1 hour, and the mixture was further subjected to a reaction for 30 hours. After completion of the reaction, the lower layer was immediately removed from the reaction solution, 2.3 kg of toluene was added to the organic layer, and the organic layer was washed with 400 g of a 12.5% aqueous sodium hydroxide solution, a saturated aqueous sodium hydrogen carbonate solution, and distilled water. The organic layer was evaporated to yield 908 g of a chloro-intermediate as a white solid.

Acrylation 908 g of the intermediate obtained above was dissolved in 1,603 g of dimethylformamide as a reaction solvent, and 372 g of potassium carbonate and methoquinone in an amount so as to give 300 ppm based on the total amount were added. The intermediate solution was heated to 40° C., and 323 g of acrylic acid was dropwise added to the intermediate solution over 1.5 hours. After the completion of the dropwise addition, the temperature was elevated to 80° C. over 2 hours, and the mixture was stirred with heating at 80° C. for 3 hours. To the resulting solution, 3.4 kg of water and 1.8 kg of toluene were added to perform extraction, and then the organic layer was washed until the water layer became neutral. The organic layer was concentrated to yield 995 g of a phenylbenzyl acrylate composition (D1) as a liquid.

Analysis of Phenylbenzyl Acrylate Composition (D1)

The obtained phenylbenzyl acrylate composition (D1) had a liquid refractive index at 25° C. of 1.592 and a viscosity of 30 mPa·s. The contents of the components in 100 parts by mass of the phenylbenzyl acrylate composition (D1) were measured using gas chromatography. As a result, phenylbenzyl acrylate was contained at 65.2 parts by mass, bis(acryloylmethyl) biphenyl was at 18.6 parts by mass, a biphenyl compound having a molecular structure including biphenyl structures linked via methylene was at 2.3 parts by mass, and biphenyl was at 5.8 parts by mass, and the remaining 8.1 parts by mass contained unreacted starting materials other than biphenyl, and the like. In addition, the mass ratio (equal to the molar ratio) of isomers of phenylbenzyl acrylate, [[o-phenylbenzyl acrylate]/[m-phenylbenzyl acrylate]/[p-phenylbenzyl acrylate]], was 20/1/79.

The conditions of the gas chromatographic analysis for the phenylbenzyl acrylate composition (D1) were as follows. Instrument: "GC-2010" manufactured by Shimadzu corporation Column: "Zebron ZB-5" manufactured by Shimadzu corporation Conditions: carrier gas: He, flow rate: 1.47 mL/min, column oven: 50° C., vaporizing chamber: 300° C., temperature rising range: 50° C. to 300° C. (25° C./min)

Examples 1 and 2, Comparative Examples 1 and 2

Active energy ray-curable compositions were prepared according to the following procedure, and the refractive index was measured for each. Table 1 shows the results.

Preparation of Active Energy Ray-Curable Composition

In Examples 1 and 2, the (meth)acrylate compound was added to the zirconium dispersion obtained in Production Example 1 in a ratio shown in Table 1, and the organic solvent component was removed under reduced pressure by evaporator. The polymerization initiator was further added to prepare an active energy ray-curable composition.

In Comparative Examples 1 and 2, the (meth)acrylate compound and the polymerization initiator were blended in a ratio shown in Table 1 to prepare an active energy ray-curable composition.

Measurement of Refractive Index

The refractive index was measured for each of the obtained active energy ray-curable compositions using an Abbe refractometer ("NAR-3T" manufactured by Atago) under a 25° C. condition.

TABLE 1

|  | Example 1 | Example 2 | Comparative Example 1 | Comparative Example 2 |
|---|---|---|---|---|
| Zirconium oxide nanoparticles (A) [parts by mass] * in terms of solid | 30 | 30 | 0 | 0 |

TABLE 1-continued

|  | Example 1 | Example 2 | Comparative Example 1 | Comparative Example 2 |
|---|---|---|---|---|
| VBIC (B1) [parts by mass] | 50 | 20 | 0 | 0 |
| PBA (D1) [parts by mass] | 20 | 50 | 50 | 80 |
| Fluorene compound (D2) [parts by mass] | 0 | 0 | 50 | 20 |
| Polymerization initiator [parts by mass] | 3 | 3 | 3 | 3 |
| Refractive index | 1.704 | 1.651 | 1.605 | 1.596 |

The invention claimed is:

1. An active energy ray-curable composition, comprising zirconium oxide nanoparticles (A) and a bicarbazole compound (B) represented by the following structural formula (1):

[Chem. 1]

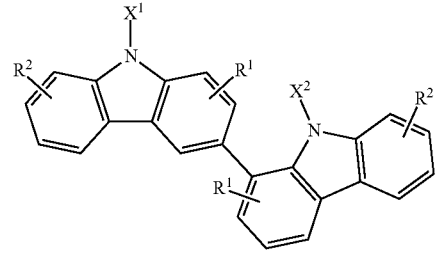

(1)

(wherein, $X^1$ and $X^2$ each independently represent a photopolymerizable functional group, a structural moiety having a photopolymerizable functional group, or a hydrogen atom, provided that at least one of $X^1$ and $X^2$ represents a photopolymerizable functional group or a structural moiety having a photopolymerizable functional group; and $R^1$ and $R^2$ each independently represent a hydrogen atom, an alkyl group having 1 to 4 carbon atoms, an alkoxy group having 1 to 4 carbon atoms, a bromine atom, or a chlorine atom).

2. The active energy ray-curable composition according to claim 1, comprising phenylbenzyl (meth)acrylate (D1) in addition to the zirconium oxide nanoparticles (A) and the bicarbazole compound (B).

3. A cured product of the active energy ray-curable composition as set forth in claim 1.

4. A plastic lens comprising a cured product of the active energy ray-curable composition as set forth in claim 1.

5. A cured product of the active energy ray-curable composition as set forth in claim 2.

6. A plastic lens comprising a cured product of the active energy ray-curable composition as set forth in claim 2.

* * * * *